United States Patent
Onomatsu et al.

(10) Patent No.: US 7,624,414 B2
(45) Date of Patent: Nov. 24, 2009

(54) BROADCAST RECEPTION APPARATUS RECEIVING BROADCAST BY USING DIRECTIONAL ANTENNA

(75) Inventors: Takehiro Onomatsu, Daito (JP); Shusuke Narita, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 557 days.

(21) Appl. No.: 11/345,758

(22) Filed: Feb. 2, 2006

(65) Prior Publication Data

US 2006/0174317 A1    Aug. 3, 2006

(30) Foreign Application Priority Data

Feb. 3, 2005    (JP)    ............... 2005-027614

(51) Int. Cl.
*H04N 7/20*    (2006.01)
(52) U.S. Cl. .................. 725/72; 348/725; 348/730
(58) Field of Classification Search .......... 725/72; 348/725, 730
See application file for complete search history.

(56) References Cited

U.S. PATENT DOCUMENTS

| | | | | |
|---|---|---|---|---|
| 5,701,599 | A * | 12/1997 | Aihara | 455/186.1 |
| 5,771,015 | A * | 6/1998 | Kirtman et al. | 342/359 |
| 6,052,366 | A * | 4/2000 | Suzuki | 370/342 |
| 6,229,480 | B1 * | 5/2001 | Shintani | 342/359 |
| 6,334,218 | B1 * | 12/2001 | Jeong et al. | 725/72 |
| 6,650,376 | B1 * | 11/2003 | Obitsu | 348/730 |
| 6,867,819 | B2 * | 3/2005 | Lee | 348/725 |
| 7,006,040 | B2 * | 2/2006 | Henderson et al. | 342/372 |
| 7,178,160 | B2 * | 2/2007 | Jeong et al. | 725/72 |
| 7,221,410 | B2 * | 5/2007 | Choi et al. | 348/725 |
| 7,505,733 | B2 * | 3/2009 | Fujimoto | 455/3.01 |
| 7,561,213 | B2 * | 7/2009 | Okamoto | 348/725 |
| 2002/0051085 | A1 * | 5/2002 | Lee | 348/570 |
| 2005/0160464 | A1 * | 7/2005 | Yamaguchi et al. | 725/68 |
| 2005/0264700 | A1 * | 12/2005 | Matsuo | 348/570 |
| 2006/0003690 | A1 * | 1/2006 | Onomatsu et al. | 455/3.02 |
| 2006/0020976 | A1 * | 1/2006 | Takagi et al. | 725/72 |
| 2006/0143673 | A1 * | 6/2006 | Okamoto | 725/105 |
| 2006/0150223 | A1 * | 7/2006 | Matsuo | 725/81 |
| 2006/0209217 | A1 * | 9/2006 | Onomatsu et al. | 348/732 |

FOREIGN PATENT DOCUMENTS

| | | |
|---|---|---|
| JP | 2003-283351 | 10/2003 |
| JP | 2003-284063 | 10/2003 |
| JP | 2004-221732 | 8/2004 |

OTHER PUBLICATIONS

Patent Abstracts of Japan, Application No. 2003-283351, dated Oct. 3, 2003 (1 page).
Patent Abstracts of Japan, Application No. 2003-284063, dated Oct. 3, 2003 (1 page).
Patent Abstracts of Japan, Application No. 2004-221732, dated Aug. 5, 2004 (1 page).

* cited by examiner

*Primary Examiner*—Christopher Kelley
*Assistant Examiner*—Mulugeta Mengesha
(74) *Attorney, Agent, or Firm*—Osha • Liang LLP

(57) ABSTRACT

A broadcast reception apparatus is connected to a directional antenna capable of changing an airwave reception direction. The broadcast reception apparatus includes a tuner selecting a frequency of airwave received by the directional antenna. When a prescribed condition is satisfied, power is supplied to the tuner, and thereafter power is supplied to the directional antenna.

3 Claims, 3 Drawing Sheets

BROADCAST RECEPTION APPARATUS RECEIVING BROADCAST BY USING DIRECTIONAL ANTENNA

BACKGROUND OF THE INVENTION

1. Field of the Invention

The present invention relates to a broadcast reception apparatus, and more particularly to a broadcast reception apparatus capable of receiving broadcast by using a directional antenna.

2. Description of the Background Art

Various techniques to cause a broadcast reception apparatus connected to an antenna for receiving airwave to carry out power ON/OFF control of the antenna have conventionally been disclosed. Such techniques are mainly directed to suppression of power consumption.

For example, Japanese Patent Laying-Open No. 2003-283351 discloses a technique to start power feed to a converter of a reception antenna on condition that at least one receiver is turned on in an apparatus connected to a reception antenna and a plurality of receivers and distributing airwave received at the reception antenna to the plurality of receivers.

In addition, Japanese Patent Laying-Open No. 2003-284063 discloses a technique to supply power to a reception antenna on condition that it is determined that no satellite broadcast wave is supplied when a satellite broadcast receiver is turned on.

Moreover, Japanese Patent Laying-Open No. 2004-221732 describes a technique related to a television broadcast reception apparatus including a terrestrial digital broadcast adapter, a satellite digital broadcast antenna and a digital unit used for receiving terrestrial digital broadcasting and satellite digital broadcasting. This publication discloses a technique to turn on one of the terrestrial digital broadcast adapter and the satellite digital broadcast antenna, depending on which is selected for broadcast reception.

Recently, a directional antenna capable of switching a radio wave reception direction has been invented as an antenna for receiving radio waves transmitted from towers of a plurality of distributed broadcast stations, instead of an antenna capable of receiving solely radio wave from one direction.

When such a directional antenna is connected, the broadcast reception apparatus not only should supply power to a variable directivity antenna but also should control directivity switching. An example of such a broadcast reception apparatus and a variable directivity antenna will specifically be described with reference to FIG. 3.

FIG. 3 shows a receiver 901 including a tuner complying with EIA Electronic Industries Association) 909 standard and an antenna 903 serving as an outdoor antenna of automatic directivity control type complying with the standard above and connected to receiver 901 through an antenna controller 902, as examples of a broadcast reception apparatus and a variable directivity antenna connected thereto, respectively. When an operation to switch a reception channel is performed in receiver 901, for example, by operating a remote controller or the like, receiver 901 adjusts directivity characteristic of antenna 903 to an electrically optimal reception direction.

Receiver 901 includes a modular terminal 913, a tuner 914, a decoder 915, and an OSD (On Screen Display) circuit 916, and further includes a CPU (Central Processing Unit) and the like for performing general operation for controlling receiver 901.

Modular terminal 913 of receiver 901 is connected to a modular terminal of antenna controller 902 through a signal line 993. Receiver 901 supplies power to antenna controller 902 and antenna 903 through signal line 993, and transmits various signals including a signal to switch directivity as appropriate. Upon receiving a reception direction switch signal transmitted from receiver 901, antenna 903 switches its directivity.

Meanwhile, a signal line 992 connects an RF (Radio Frequency) terminal of antenna 903 to an RF terminal of antenna controller 902 and a signal line 991 connects the RF terminal of antenna controller 902 to an RF terminal of tuner 914 so that antenna 903 and receiver 901 are connected to each other through the RF terminals.

Antenna controller 902 supplies power and various signals supplied from receiver 901 to antenna 903 through signal line 992, and receives a broadcast signal from antenna 903 received by the same and transmits the signal to tuner 914.

In receiver 901, the broadcast signal received by a tuner 14 is decoded by a decoder 15, and thereafter it is combined as appropriate with display information such as setting contents or the like in an STB 1 generated in an OSD circuit 16. The resultant signal is output to a not-shown television connected to receiver 901.

As described above, it is considered that connection for power supply and connection for control information are established between the broadcast reception apparatus and the variable directivity antenna. Meanwhile, when the broadcast reception apparatus and the variable directivity antenna are used at home, these apparatuses may be connected by a user. If connection is improper, however, power that should be supplied to the variable directivity antenna is returned to the broadcast reception apparatus, which may result in damage. Therefore, when the broadcast reception apparatus is connected to the variable directivity antenna, the broadcast reception apparatus should be provided with some measure for avoiding such damage.

For example, a polyswitch may be connected to a point of connection to the variable directivity antenna in the broadcast reception apparatus.

Conventionally, it has always been desired that the broadcast reception apparatus is provided with a measure for further ensured safety.

SUMMARY OF THE INVENTION

The present invention was made in view of the above-described circumstances, and an object of the present invention is to achieve further ensured safety in a broadcast reception apparatus receiving airwave through a variable directivity antenna.

A broadcast reception apparatus according to one aspect of the present invention includes a connection portion connected to a directional antenna capable of changing an airwave reception direction, a tuner selecting a frequency of airwave received by the directional antenna, and a control unit accepting power supply from an external power supply and controlling a manner of power supply from the external power supply to the tuner and the directional antenna. The control unit allows power supply to the directional antenna after power supply to the tuner.

A broadcast reception apparatus according to another aspect of the present invention includes a connection portion connected to a directional antenna capable of changing an airwave reception direction, a tuner selecting a frequency of the airwave received by the directional antenna, an output portion outputting image and sound based on the airwave received by the directional antenna, a control unit accepting power supply from an external power supply, controlling a direction of airwave reception by the directional antenna, and controlling a manner of power supply from the external power supply to the tuner, the output portion and the directional antenna, and a determination unit determining whether or not the directional antenna is properly connected to the connection portion. The determination unit includes a transmission unit transmitting a prescribed signal to the directional antenna, a reception unit receiving a signal from the directional antenna, and a decision unit deciding whether or not the reception unit has received a specific signal. When the decision unit decides that the reception unit has received the specific signal, the determination unit determines that the directional antenna is properly connected to the connection portion. Meanwhile, when the decision unit decides that the reception unit has not received the specific signal or when a manner of reception is not changed even if the control unit causes the direction of reception by the directional antenna to change with regard to the airwave in a specific channel, the determination unit determines that the directional antenna is not properly connected to the connection portion. The control unit allows power supply to the directional antenna after power supply to the tuner and the output portion. When the determination unit determines that the directional antenna is not properly connected after power supply to the directional antenna is started, the control unit causes an operation to supply power to the directional antenna to stop.

According to the present invention, timing at which power is supplied to the directional antenna in the broadcast reception apparatus is set to timing after power is supplied to the tuner, that is, set to timing as late as possible.

Accordingly, a time from start of operation for power supply to the directional antenna until improper connection is eliminated as a result of detection or the like of improper connection in the broadcast reception apparatus can be made as short as possible. Therefore, improper connection between the broadcast reception apparatus and the directional antenna can be detected and eliminated in a short period of time from the start of operation for power supply to the directional antenna.

In this manner, further ensured safety is achieved in the broadcast reception apparatus receiving the airwave through the directional antenna.

In addition, according to the present invention, if it is determined that proper connection with the directional antenna is not made in the broadcast reception apparatus, the operation for power supply to the directional antenna is stopped. Accordingly, if connection with the directional antenna is improper in the broadcast reception apparatus, safety is further ensured.

Moreover, according to the present invention, whether or not connection with the directional antenna is proper is clearly recognized in the broadcast reception apparatus. Therefore, processing suitable for a case in which connection with the directional antenna is improper is performed in an ensured manner.

Further, according to the present invention, in the broadcast reception apparatus, the timing at which power is supplied to the directional antenna is later than the timing of power supply to the output portion. Therefore, safety of the broadcast reception apparatus is further ensured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the broadcast reception apparatus according to the present invention will be described in detail with reference to the drawings. Though a smart antenna is adopted herein as an exemplary antenna, the directional antenna capable of changing an airwave reception direction in the present invention is not limited thereto. Any antenna of another type, that is, any directional antenna capable of switching a reception direction (Multi-Directional antenna), may be employed.

Figure 1:
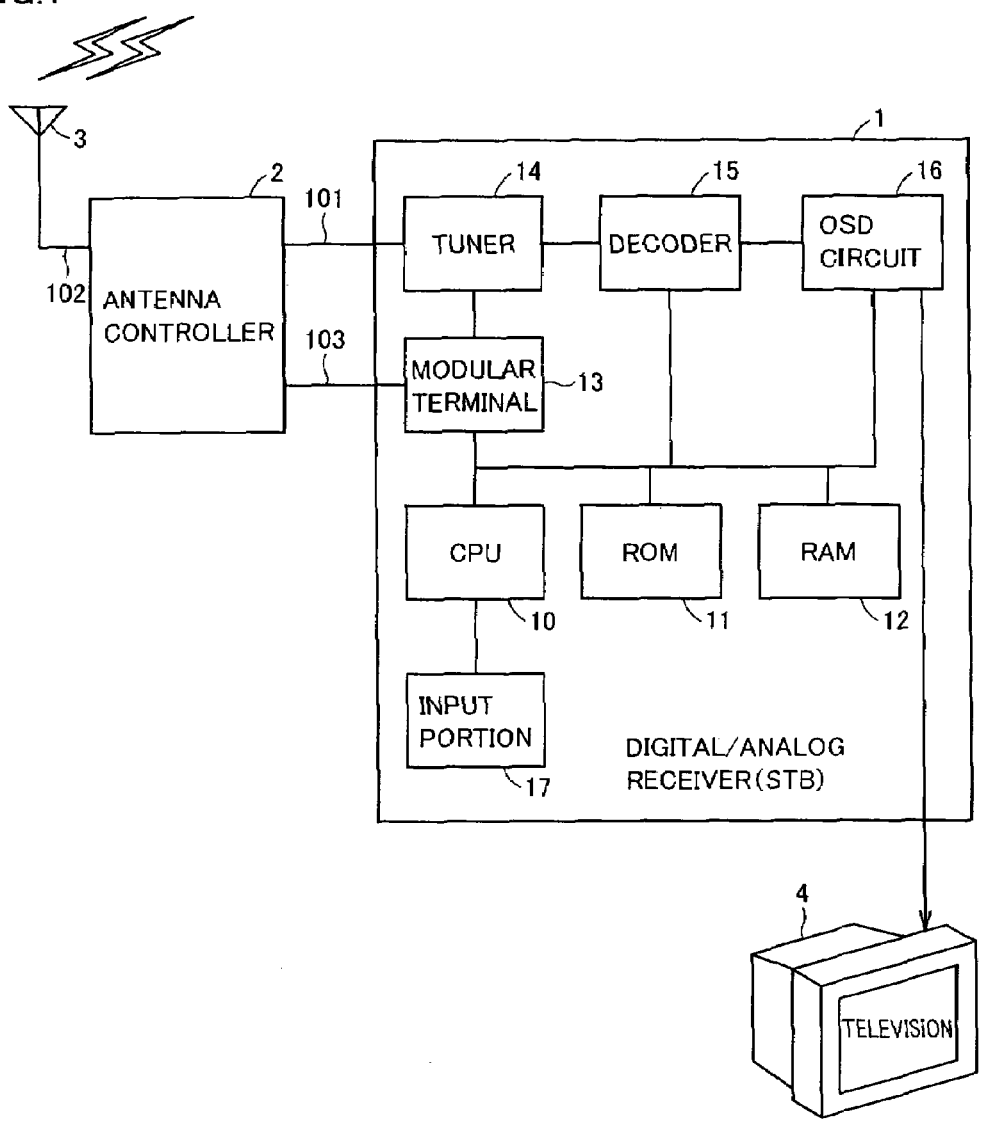
FIG. 1 shows a schematic configuration of a digital/analog receiver (STB) representing one embodiment of a broadcast reception apparatus of the present invention.

A configuration of a digital/analog receiver (hereinafter, abbreviated as "STB" (Set Top Box)) complying with EIA 909 standard representing one embodiment of the broadcast reception apparatus according to the present invention will be described with reference to FIG. 1.

STB 1 is connected to a smart antenna 3 through an antenna controller 2. The smart antenna refers to an antenna constituted of a plurality of antenna elements, capable of switching directivity by exciting each antenna element with an appropriate amplitude and phase. It is assumed here that the smart antenna in the present embodiment complies with the EIA 909 standard, as in the case of STB 1.

A modular terminal 13 of STB 1 is connected to a modular terminal of antenna controller 2 through a signal line 103. STB 1 supplies power to antenna controller 2 and smart antenna 3 through signal line 103 and transmits as appropriate a signal for switching directivity (a reception direction switch signal) or the like. Upon receiving the reception direction switch signal transmitted from STB 1, smart antenna 3 switches the directivity by varying excitation of each antenna element.

A signal line 102 connects an RF terminal of smart antenna 3 to an RF terminal of antenna controller 2 and a signal line 101 connects the RF terminal of antenna controller 2 to an RF terminal of tuner 14 so that smart antenna 3 and STB 1 are connected to each other through the RF terminals.

Antenna controller 2 supplies power and various signals supplied from STB 1 to smart antenna 3 through signal line 102, and receives the airwave (broadcast signal) from smart antenna 3 received by the same and transmits the airwave to tuner 14.

In STB 1, the broadcast signal received by tuner 14 is decoded by decoder 15, and thereafter it is combined as appropriate with display information such as setting contents or the like in STB 1 generated in OSD circuit 16 and output to a television 4. In this manner, image and/or sound based on the broadcast signal received by tuner 14 is output to television 4.

STB 1 includes a CPU 10 for overall control of an operation of STB 1, an ROM (Read Only Memory) 11 storing information such as a program for processing executed by CPU 10, an RAM (Random Access Memory) 12 attaining a function as a work area or the like of CPU 10, and an input portion 17 implemented by a button or the like and accepting externally input information.

Tuner 14 contains a digital demodulator. The digital demodulator demodulates the broadcast signal obtained in tuner 14 to an MPEG signal serving as a video and audio signal and outputs the MPEG signal to decoder 15. As the digital television broadcast signal is encoded with a Reed-Solomon code and a convolutional code for transmission, the digital modulator as above is capable of error correction. In the processing for error correction, the digital demodulator operates a reception data error rate of the received broadcast signal, and outputs the reception data error rate to CPU 10. Here, as the digital demodulator performs error correction for prescribed number of pieces of data contained in the received broadcast signal, the reception data error rate can be operated within one frame (1/30 second) from the start of reception. CPU 10 can determine a signal level of the broadcast signal based on the reception data error rate.

In addition to ISDB-T (Integrated Services Digital Broadcasting for Terrestrial) scheme employed in Japan, the schemes of the digital television broadcast include ATSC (Advanced Television Systems Committee) scheme employed in the United States and DVB-T (Digital Video Broadcasting for Terrestrial) employed in Europe. As the broadcast signal is transmitted after being encoded in any scheme, the broadcast signal can be subjected to error correction and the reception data error rate can be operated during the processing for error correction. Therefore, the digital demodulator in the present embodiment may be adapted to any scheme described above.

Tuner 14 also contains an analog demodulator. The analog demodulator demodulates the broadcast signal obtained in tuner 14 to a video signal and an audio signal. The signal demodulated in the analog demodulator is sent to OSD circuit 16 without being processed by decoder 15.

The analog television broadcast signal includes a horizontal synchronizing signal and a vertical synchronizing signal in order to control horizontal scanning and vertical scanning of scanning lines. The analog demodulator should capture the horizontal synchronizing signal and the vertical synchronizing signal described above in order to demodulate the video signal. Here, as the horizontal synchronizing signal is sufficiently higher in frequency than the vertical synchronizing signal, the horizontal synchronizing signal is more susceptible to noise or the like than the vertical synchronizing signal. Namely, a reception status can be determined based on whether or not the horizontal synchronizing signal has successfully been captured.

In addition to NTSC (National System Committee) scheme employed in Japan or the United States, the schemes of the analog television broadcast include PAL (Phase Alteration by Line) scheme employed in Germany, the UK and the like and SECAM (Sequential Couleur a Memoire) scheme employed in France and the like. As the broadcast signal includes the horizontal synchronizing signal in any scheme, a reception status can be determined based on whether or not the horizontal synchronizing signal has successfully been captured. The analog demodulator in the present embodiment can be adapted to any scheme.

Figure 2:
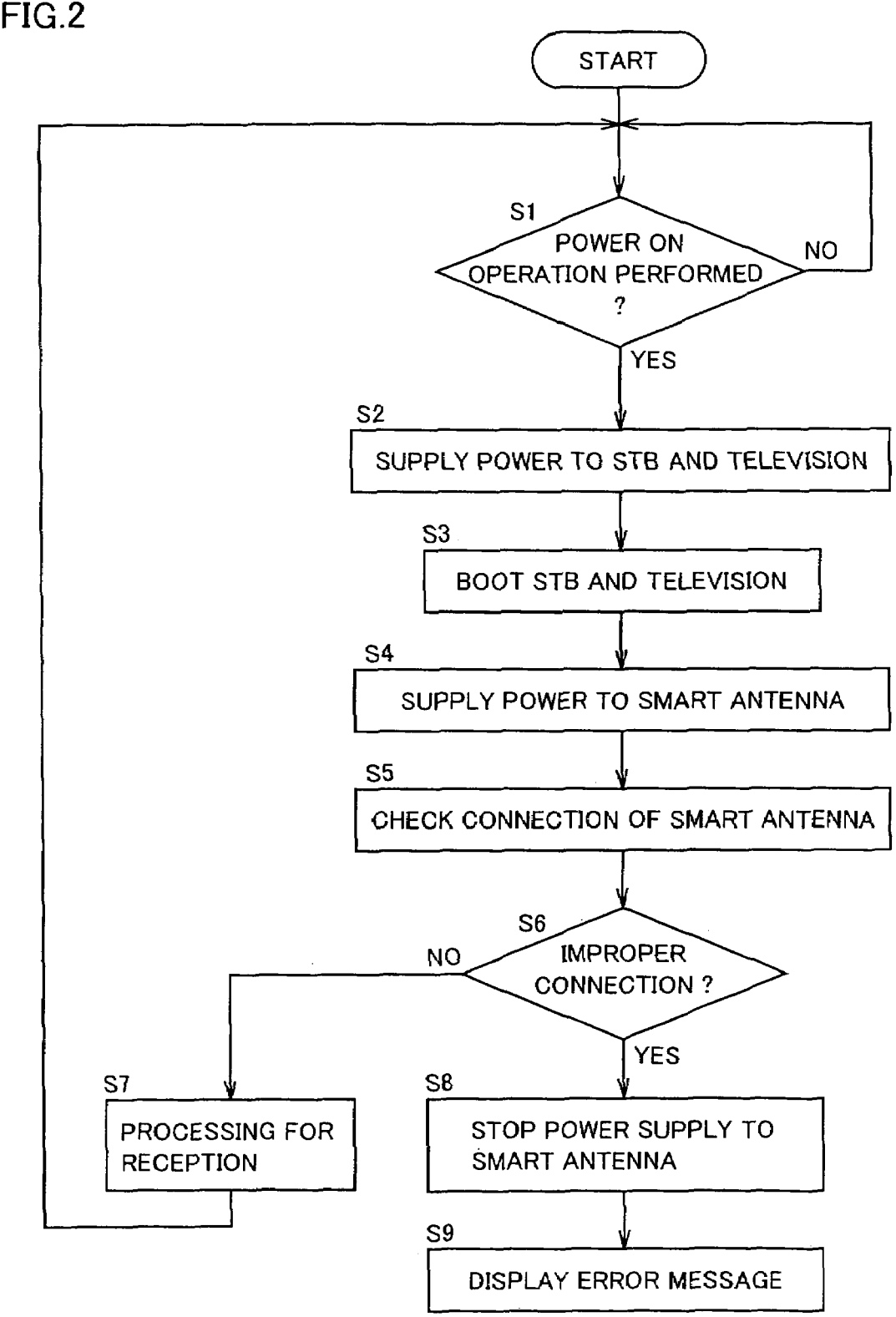
FIG. 2 is a flowchart of a main routine executed by a CPU in FIG. 1.
Figure 3:
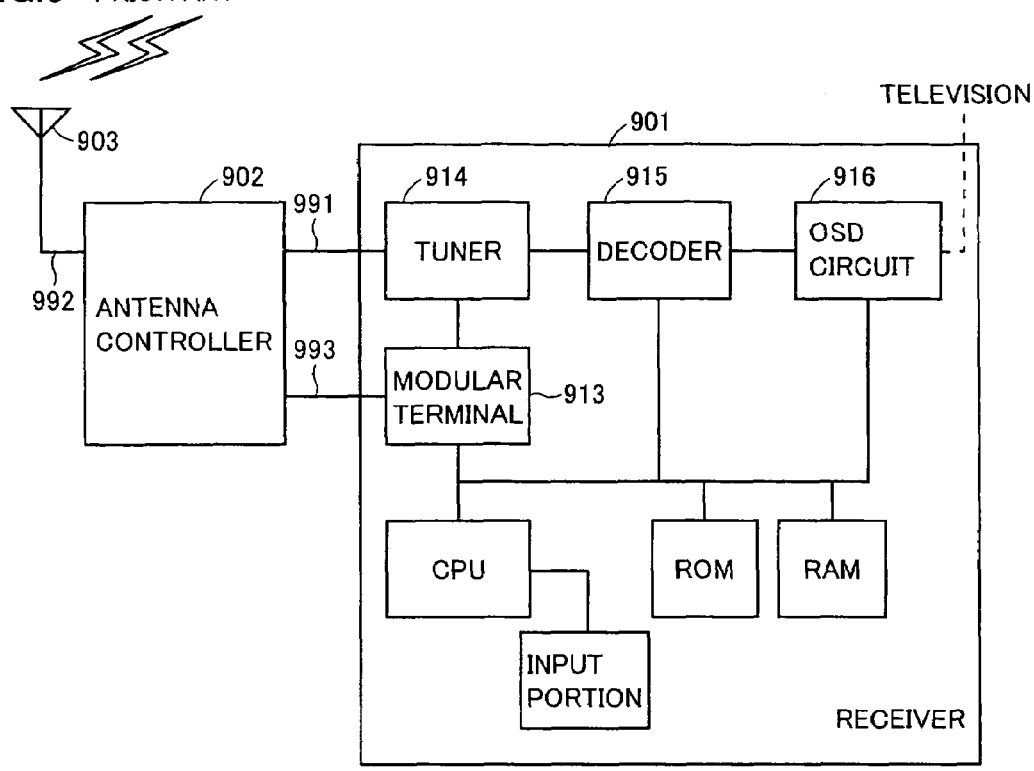
FIG. 3 shows one example of a conventional broadcast reception apparatus and a variable directivity antenna.

An operation performed in STB 1 will now be described with reference to FIG. 2.

When power supply to CPU 10 is started in STB 1, for example, by connection of STB 1 to an outlet, CPU 10 initially determines at step S (hereinafter, step is abbreviated) 1 whether or not an operation to turn on STB 1 through input portion 17 has been performed. If it is determined that such an operation has been performed, the process proceeds to S2.

At S2, CPU 10 starts power supply to tuner 14, decoder 15 and OSD circuit 16 that require power supply in STB 1, and starts power supply to television 4.

Thereafter, at S3, CPU 10 starts initialization of tuner 14, decoder 15 and OSD circuit 16 as well as television 4 based on the setting contents or the like stored in RAM 12.

Then, at S4, CPU 10 starts power supply to smart antenna 3 through modular terminal 13.

Thereafter at S5, CPU 10 performs processing for checking connection of smart antenna 3. The contents of the processing for checking connection will be described later.

At S6, CPU 10 determines whether or not there is improper connection based on a result of connection check of smart antenna 3 that has been performed at S5. If it is determined that there is improper connection, the process proceeds to S8. If it is determined that there is no improper connection, that is, proper connection has been confirmed, the process proceeds to S7.

At S7, CPU 10 performs as appropriate image reception processing for output to television 4 of video image and sound in accordance with the broadcast signal received by smart antenna 3, in response to a user's operation through input portion 17 until STB 1 is turned off in response to an operation through input portion 17. Thereafter the process returns to S1, at which CPU 10 waits for turn-on of STB 1.

On the other hand, at S8, CPU 10 causes the operation for power supply to smart antenna 3 to stop. At S9, CPU 10 causes television 4 to display an error message that smart antenna 3 is not properly connected, and the process ends.

Here, the contents of the processing for checking connection of smart antenna 3 will be described. Though there are two types of smart antennas, i.e., smart antennas adapted to mode A and mode B, the description herein will be given to cover both of these.

In checking connection, initially, CPU 10 transmits a specific pulse signal to smart antenna 3 through modular terminal 13. The specific pulse signal herein refers to a pulse signal for detecting a smart antenna adapted to mode B.

Thereafter, CPU 10 determines whether or not such a signal from smart antenna 3 as responding to the specific pulse signal has been received by tuner 14 within a prescribed time period. If it is determined that such a signal has been received, the process at S6 and later is performed, assuming that smart antenna 3 is properly connected.

The prescribed time period refers to a time period generally required by smart antenna 3 for responding to the specific pulse signal as above or a time period having a certain margin added to the former. The prescribed time period may be determined as appropriate for each apparatus.

If it is determined that the responding signal from smart antenna 3 has not been received by tuner 14 within the prescribed time period, CPU 10 tunes a channel to be received by smart antenna 3 to a channel that has already been adapted to receive a program, and thereafter CPU 10 determines whether or not reception intensity of the broadcast signal corresponding to the channel at the time of change in the reception direction of smart antenna 3 has varied at least by a prescribed amount. If it is determined that the reception intensity has varied at least by the prescribed amount, CPU 10 performs the processing at S6 and later, assuming that the smart antenna adapted to mode A is properly connected as smart antenna 3.

On the other hand, if variation at least by the prescribed amount in the reception intensity of the broadcast signal with regard to the channel is not observed in spite of change in the reception direction of smart antenna 3, CPU 10 performs the processing at S6 and later, assuming that the smart antenna is not properly connected.

In the present embodiment described above, when power is supplied to CPU 10 and an operation to turn on STB 1 is performed through input portion 17 in STB 1, CPU 10 supplies power to tuner 14, decoder 15, OSD circuit 16, and television 4, and initializes the same. Thereafter, CPU 10 supplies power to smart antenna 3.

In addition, according to the description of the present embodiment above, when power is supplied to CPU 10, CPU 10 waits for an operation through input portion 17 at S1, and thereafter the processing at S2 and later is performed. Namely, in the present embodiment, when the operation through input portion 17 is performed, it is assumed that a "prescribed condition" in the present invention is satisfied.

If STB 1 includes a timer attaining a function to count time and STB 1 is configured to be capable of what is called a scheduled operation such as start of operation when a pre-registered time comes, CPU 10 may be configured such that whether or not the pre-registered time comes is determined at S1 and processing at S2 and later is performed upon arrival of the pre-registered time. Namely, it may be assumed that a "prescribed condition" in the present invention is satisfied also when the pre-registered time comes.

In addition, according to the description of the present embodiment above, STB 1 and antenna controller 2 are implemented as separate components, however, the broadcast reception apparatus according to the present invention is not limited as such. Namely, STB 1 and antenna controller 2 may integrally be formed. With such a configuration, when the user uses STB 1 and antenna controller 2, it is no longer necessary for the user himself/herself to perform wiring for connecting STB 1 with antenna controller 2, whereby inconvenience caused by improper wiring can be avoided in an ensured manner.

Moreover, according to the description of the present embodiment above, antenna controller 2 and smart antenna 3 are implemented as separate components, however, the configuration of the variable directivity antenna according to the present invention is not limited as such. Namely, antenna controller 2 and smart antenna 3 may integrally be formed. With such a configuration, power is supplied from STB 1 to smart antenna 3 directly, that is, without passing through antenna controller 2 which is a separate apparatus. Therefore, safety in both of these apparatuses can be improved.

Further, in the present embodiment described above, CPU 10 checks connection of the smart antenna by sending a pulse signal thereto. Alternatively, in the processing for checking connection, whether or not signal lines 101, 102 are connected to terminals therefor in modular terminal 13 and tuner 14 respectively may be detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A broadcast reception comprising:
    a connection portion connected to a directional antenna capable of changing an airwave reception direction;
    a tuner selecting a frequency of airwave received by said directional antenna;
    a control unit accepting power supply from an external power supply and controlling a manner of power supply from the external power supply to said tuner and said directional antenna; and
    a determination unit determining whether said directional antenna is properly connected to said connection portion,
    wherein said control unit allows power supply to said directional antenna after power supply to said tuner, and
    wherein said control unit causes an operation to supply power to said directional antenna to stop when said determination unit determines that said directional antenna is not properly connected to said connection portion after power supply to said directional antenna is started.

2. The broadcast reception apparatus according to claim 1, wherein
    said determination unit includes
    a transmission unit transmitting a prescribed signal to said directional antenna,
    a reception unit receiving a signal from said directional antenna, and
    a decision unit deciding whether said reception unit has received a specific signal, and when said decision unit decides that said reception unit has received said specific signal, said determination unit determines that said directional antenna is properly connected to said connection portion.

3. The broadcast reception apparatus according to claim 1, wherein
    said control unit controls a direction of airwave reception by said directional antenna,
    said determination unit includes
    a transmission unit transmitting a prescribed signal to said directional antenna,
    a reception unit receiving a signal from said directional antenna, and a decision unit deciding whether said reception unit has received a specific signal, and
    when said decision unit decides that said reception unit has not received said specific signal or when a manner of reception is not changed even if said control unit causes the direction of reception by said directional antenna to change with regard to the airwave in a specific channel, said determination unit determines that said directional antenna is not properly connected to said connection portion.

* * * * *